Oct. 25, 1966 TAMIO UEMURA ETAL 3,281,100
DEVICES FOR MOUNTING CLUTCH MOTORS ON MACHINES
Filed Oct. 14, 1964
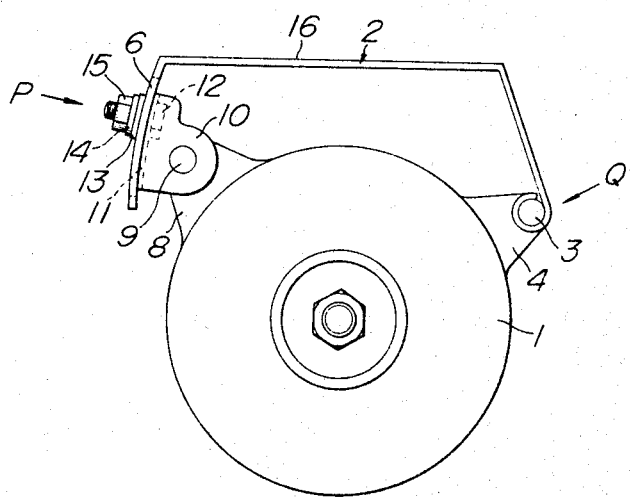
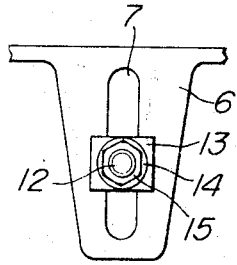 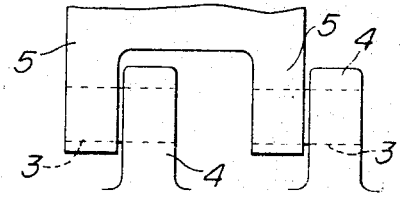
INVENTORS
TAMIO UEMURA
EISHO MASUDA
SHIGEYASU SUZUKI
BY Paul M. Craig, Jr.
ATTORNEY

3,281,100
DEVICES FOR MOUNTING CLUTCH MOTORS ON MACHINES

Tamio Uemura and Eisho Masuda, Hitachi-shi, and Shigeyasu Suzuki, Iwate-ken, Japan, assignors to Hitachi, Ltd., Tokyo, Japan, a corporation of Japan
Filed Oct. 14, 1964, Ser. No. 403,800
Claims priority, application Japan, Oct. 15, 1963, 38/77,572
2 Claims. (Cl. 248—16)

The present invention relates to an improvement in the structure of devices for mounting clutch motors on machine portions.

Clutch motors are commonly incorporated in machines such as industrial sewing machines and machine tools and are provided with a clutch for interrupting the rotation transmitted thereto through a pulley. In a common practice with the clutch motors, a slide base is used to mount the motor on a machine, for various inconveniences have hitherto been experienced in respect of adjustment of belt tension as well as mounting and dismounting of the motor.

Therefore, the primary object of the present invention is to provide an improved mounting device for clutch motors which facilitates adjustment of belt tension as well as mounting and dismounting of the motor.

According to the present invention, there is provided a device for mounting a clutch motor on a machine, comprising an arm extending radially outwardly from the motor body, a pivot pin integral with said arm and extending in the axial direction of said motor body, a slide base having one end pivotally supported by said pivot pin in a manner to be slidable in the axial direction of said pivot pin and having the other end bent inwardly towards said motor body to form an L-like shape, the said other end being curved along the circumference of a circle about the axis of said pivot pin so as to act as an adjusting plate means, a lug extending radially outwardly from said motor body, a slide base supporting member pivotally mounted on said lug by an engaging pin and having its outer face disposed opposite the inner face of said slide base adjusting plate means, and screw means for fastening said slide base supporting member to said slide base adjusting plate means.

Other objects and advantages of the present invention will become obvious from the following description with reference to the accompanying drawings, in which:

FIG. 1 is a front elevational view of a mounting device embodying the present invention;

FIG. 2 is an enlarged partial side view taken substantially in the direction of arrow P in FIG. 1; and FIG. 3 is also an enlarged partial side view taken substantially in the direction of arrow Q in FIG. 1.

Now, referring to FIG. 1, there is shown a motor body 1 which is adjustably mounted on a machine portion 16 by means of a slide base 2. The slide base 2 is pivotal about pivot pins 3 so that a distance between the motor axis to the machine portion 16 can easily be adjusted. In order to provide pivotal connection between the slide base 2 and the motor body 1, a pair of spaced parallel arms 4 extend radially outwardly from the motor body 1 and the pivot pins 3 are integrally secured to the respective arms 4, as shown in FIG. 3. One end of the slide base 2 is bifurcated to form projections 5 which have bores for loosely receiving therein the pivot pins 3 so that the projections 5 are pivotal about the pins 3 and slidable in the axial direction of the pins 3. The other end of the slide base 2 is bent inwardly towards the motor body 1 to take an L-like shape in a manner that it is curved along the circumference of a circle about the common axis of the pivot pins 3 to thereby act as a slide base adjusting plate means 6. A slot 7 is formed in the longitudinal direction of the adjusting plate means 6. A lug 8 is formed integrally with the motor body 1, and a slide base supporting member 10 of substantially U-shaped cross section straddles the lug 8 and is pivotally connected thereto by means of an engaging pin 9. The supporting member 10 has an outer face 11 which is disposed opposite the inner face of the slide base adjusting plate means 6 and is suitably curved to simulate the curvature of the latter. A bolt 12 is provided in the slide base supporting member 10 and extends outwardly through the outer face 11 thereof and through the slot 7 of the slide base adjusting plate means 6, and a nut 15 is screwed on the exposed end of the bolt 12 with a washer 13 and a lock spring washer 14 interposed between the nut 15 and the outer face of the adjusting plate means 6 to fasten the outer face 11 of the slide base supporting member 10 onto the inner face of the adjusting plate means 6.

The mounting device of the present invention with the structure as described above operates in the following manner. When it is desired to dismount the motor body 1, at first the nut 15 is unscrewed on the bolt 12 for removal therefrom and the slide base supporting member 10 is pivoted about the pin 9 until the bolt 12 completely gets out of the slot 7. Then, the motor body 1 is pivoted about the pins 3, which can then be pulled outwardly along the bores of the projections 5 of the slide base 2 so that the motor body 1 can easily be dismounted from the machine portion 16 without dismounting the slide base 2. It will be known that this arrangement is quite convenient for repair, maintenance, etc. of the motor since the motor body 1 alone can be dismounted independently of the supporting members therefor.

In the mounting operation of the motor body 1, at first the slide base 2 is mounted in place on the machine portion and the pivot pins 3 on the arms 4 of the motor body 1 are fitted in the bores of the projections 5 on the slide base 2. Then, the slide base supporting member 10 mounted on the lug 8 of the motor body 1 is pivoted along the inner face of the slide base adjusting plate means 6, and the washer 13 and lock spring washer 14 are fitted on the bolt 12 extending outwardly through the slot 7, the nut 15 being subsequently screwed on the bolt 12 to fasten the slide base supporting member 10 onto the slide base adjusting plate means 6. Thus, the motor body 1 can extremely easily be mounted on the slide base 2.

For the tension control of a V-belt or the like passed on the motor, the nut 15 may be slightly unscrewed and the slide base supporting member 10 may be slided along the inner face of the slide base adjusting plate means 6. Then, the motor body 1 can freely be pivoted about the pivot pins 3 to permit adjustment of the position of the motor body 1 relative to the machine portion 16 to thereby adjust the tension of the V-belt or the like. It will be understood that the above-described tension control can smoothly be effected since the slide base supporting member 10 slides along the inner face of the slide base adjusting plate means 6 formed along the circumference of the circle about the common axis of the pivot pins 3. It will also be understood that such tension control can easily be effected as by a wrench without requiring special tools.

What is claimed is:

1. A device for mounting a clutch motor on a machine, comprising an arm extending radially outwardly from the motor body, a pivot pin integral with said arm and extending in the axial direction of said motor body, a slide base having one end pivotally supported by said pivot pin in a manner to be slidable in the axial direction of said pivot pin and having the other end bent inwardly towards said motor body to form an L-like shape, the said other end being curved along the circumference of a circle about the axis of said pivot pin so as to act as an adjusting plate means, a lug extending radially outwardly from said motor body, a slide base supporting member pivotally mounted on said lug by an engaging pin and having its outer face disposed opposite the inner face of said slide base adjusting plate means, and screw means for fastening said slide base supporting member to said slide base adjusting plate means.

2. A device for mounting a clutch motor on a machine according to claim 1, in which said screw means comprise a bolt secured to said slide base supporting member and extending outwardly through a slot in said slide base adjusting plate means and a nut on said bolt for adjustably fastening said slide base supporting member to said slide base adjusting plate means to permit adjustment of the position of said motor body relative to the machine.

References Cited by the Examiner
UNITED STATES PATENTS

| | | | |
|---|---|---|---|
| 1,135,257 | 4/1915 | Carlin | 248—16 |
| 2,643,838 | 6/1953 | Schweda | 248—16 |

CLAUDE A. LE ROY, *Primary Examiner.*

JOHN PETO, *Examiner.*